Figure 1:
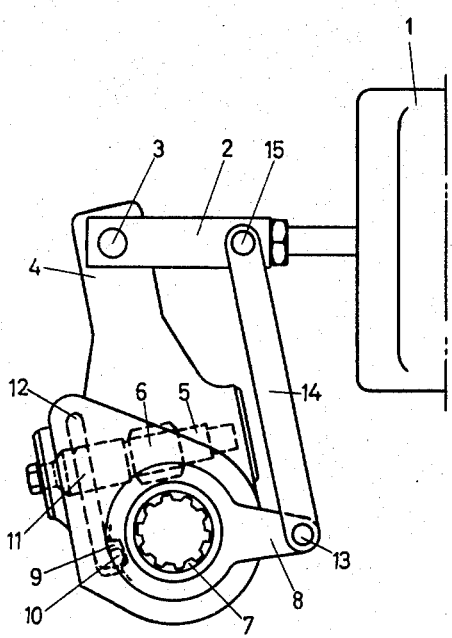

United States Patent
Larsson

[15] 3,692,152
[45] Sept. 19, 1972

[54] SLACK ADJUSTER CONNECTION ARRANGEMENT

[72] Inventor: Karl Bertil Larsson, Malmo, Sweden

[73] Assignee: Srienska Aktienbolaget Bromsregulator, Malmo, Sweden

[22] Filed: Dec. 15, 1970

[21] Appl. No.: 98,351

[52] U.S. Cl. ..........188/79.5 K, 74/522, 188/196 BA
[51] Int. Cl. ..............................................F16d 65/56
[58] Field of Search.......74/522; 188/79.5 K, 196 BA

[56] References Cited

UNITED STATES PATENTS 2,752,009   6/1956   MacDougall............74/522 X
3,351,164   11/1967  Svensson...............188/79.5 K Primary Examiner—Milton Kaufman
Attorney—Laurence R. Brown

[57] ABSTRACT

A slack adjuster is shown which is splined to a rotatable brake shaft. The slack adjuster serves to rock about that shaft by a linkage coupling the shaft to a brake applying piston rod. The slack is adjusted by means of a worm wheel mechanism mounted on and secured against rotation relative to the shaft wherein slack is adjusted by altering the position of the linkage about the shaft when the worm wheel is rotated. In the linkage is coupled a radial arm rotatable about said shaft in a housing forming part of the linkage. A rigid link is connected between the radial arm and the piston rod to confine rotation of the radial arm about said shaft.

4 Claims, 2 Drawing Figures

PATENTED SEP 19 1972

3,692,152

INVENTOR
Karl B. Larsson

BY Laurence R. Brown
ATTORNEY

SLACK ADJUSTER CONNECTION ARRANGEMENT

This invention relates to a connection arrangement of a vehicle brake linkage slack-adjuster of the kind (hereinafter called "the kind referred to") comprising a lever-housing which forms a member of the linkage and is mounted for rocking about the axis of rotation of a shaft which is partially rotated about its said axis for applying or releasing the brake, force being transmitted between the lever-housing and the shaft with the aid of a worm mounted for rotation in the lever-housing and meshing with a worm wheel mounted on and secured against rotation relative to the shaft, the arrangement being such that when the slack-adjuster is in use automatic adjustment of the slack in a brake linkage is effected by rotating the worm by means including a radial arm to alter the position of the worm wheel and the shaft relative to the lever-housing, the said radial arm being mounted for limited rotation relative to the lever-housing about the axis of rotation of the shaft, and the said lever-housing being pivotally connected to a piston rod of a cylinder-piston unit for applying and releasing the brake. In a slack-adjuster of the kind referred to it is usual to make provision for manual rotation of the worm in addition to the said means for rotating the worm automatically so as to maintain the slack within predetermined limits, and the said shaft is usually a brake-actuating cam shaft.

Slack-adjusters of the kind referred to are often incorporated in the brake linkages of heavy road vehicles, and they may be operated manually by means of a wrench or other tool engaging a suitably-formed head on a worm end protruding from the housing in addition to being operated automatically according to various known constructions. U.S. Pat. Nos. 3,392,810 and 3,351,163 and 3,351,164 and 3,444,758 disclose some proposals in connection with several slack-adjusters which have various features in common with slack-adjusters of the kind referred to.

Hitherto in a conventional connection arrangement of a slack-adjuster of the kind referred to it has been usual to fasten the said radial arm rigidly directly or indirectly to a vehicle part which remains stationary in relation to the axis of rotation of the said shaft.

Such a conventional connection arrangement, however, is often found to be inconvenient or expensive. The present invention is therefore intended to provide an improved connection arrangement of a slack-adjuster of the kind referred to and to eliminate the need for any parts or portions of the slack-adjuster to be fastened rigidly to any parts of a vehicle to which the slack-adjuster is applied.

According to the invention there is provided a connection arrangement of a slack-adjuster of the kind referred to, characterized in that the said radial arm is connected to the said piston rod by means of a link which is pivotally attached to the radial arm and to the piston rod and extends substantially parallel to a plane which includes the axis of rotation of the said shaft and the axis of the pivotal connection of the lever-housing to the piston rod. The said link may be a simple substantially rigid integer or it may be adjustable in length.

Figure 2:
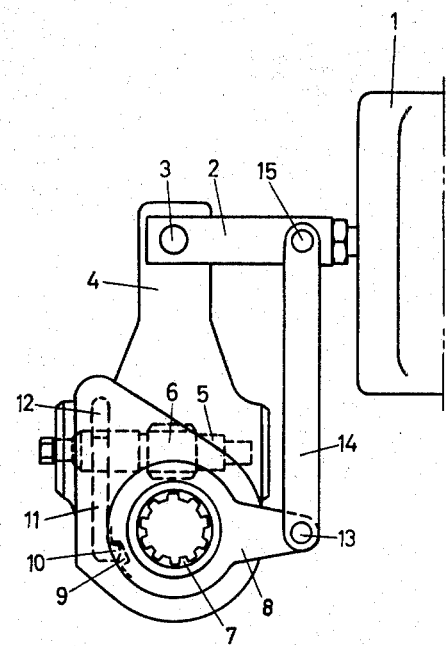

In the accompanying drawings a connection arrangement in accordance with the invention with a slack-adjuster of the kind referred to is illustrated by way of example in two partly diagrammatic side views, in which FIG. 1 shows the brake-applied position, and FIG. 2 shows the brake-released position.

Referring to the drawings, a pneumatic or hydraulic cylinder-piston unit comprises a cylinder 1 in which is a piston having a piston rod 2 pivotally connected by a pivot pin 3 to a lever-housing 4 in which a worm spindle 5 carrying a worm 6 is journalled. The said worm 6 meshes with an internally-splined worm wheel 7 mounted on a correspondingly externally-splined brake-actuating cam shaft (not shown). A radial arm 8 extends into the lever-housing 4 and is journalled to be rotatable relative thereto around the common axis of rotation of the said shaft and the worm wheel 7. The arm 8 is provided with an annular portion in which is a notch 9 receiving a projection 10 provided at the end of a slide member 11 movably guided in an interior guideway 12 in the lever-housing 4. The slide member 11 is provided with a toothed rack (not shown) engaging a gear wheel (not shown) mounted on the worm spindle 5 so that when the slack-adjuster is in use automatic adjustment of the slack in the brake linkage is effected, the notch 9 and projection 10 allowing limited lost motion in known manner.

The outer end of the radial arm 8 is pivotally connected by a pivot pin 13 to the lower end of a link 14 to the upper end of which is pivotally connected by a pivot pin 15 to the piston rod 2. The pivot pins 13 and 15 are at substantially equal distances from the axis of rotation of the worm wheel 7 and the pivot pin 3 respectively. Thus the link 14 extends substantially parallel to a plane which includes the common axis of rotation of the said shaft and of the worm wheel 7 and of the lever-housing 4 and also includes the axis of the pivotal connection by the pin 3 of the piston rod 2 to the lever-housing 4.

It will be apparent that the limited lost motion allowed by the notch 9 and the projection 10 will become exhausted after a predetermined length of piston rod travel, the arm 8 remaining substantially parallel to the piston rod 2 as it would if the arm 8 were connected to a part of the vehicle which remains stationary in relation to the axis of rotation of the worm wheel 7 and the said shaft.

The link 14 is shown in the form of a simple substantially rigid integer, but it may conveniently be adjustable in length to facilitate the work of initially installing the slack-adjuster on a vehicle or to widen the range of possible applications of the slack-adjuster.

The piston rod 2 may be articulated or be pivotally attached to its piston or other known ways may be adopted to allow any necessary motions of the pivot pins 3 and 15 transverse to the longitudinal axis of the cylinder 1.

What is claimed is:

1. A slack adjuster arrangement for operation to rotate a brake shaft about its axis in a brake system on a vehicle said slack adjuster being of the type having a reference position for coupling relatively to a position on said vehicle on which the adjuster is used, comprising in combination a rod movable to apply braking forces in said system by rotating said shaft, a worm gear arrangement coupled between said rod and said shaft to rotate the shaft comprising a worm gear movable by said rod and a worm wheel coaxially mounted with said axis engaging said worm gear, slack adjusting means rotating the worm gear to adjust the slack in the brake system, and means establishing said reference position comprising a radial arm rotatable about said axis with the worm wheel and a link pivotally attached at fixed positions to said radial arm and said rod.

2. An arrangement as defined in claim 1 wherein the rod is pivotally connected at a pivot axis to the worm gear arrangement, and wherein said link extends substantially parallel to a plane which includes the axis of rotation of said shaft and said pivot axis.

3. An arrangement as defined in claim 1 wherein said link comprises a rigid integer connected between said arm and said rod.

4. An arrangement as defined by claim 1 including a housing member rotatable about said shaft, wherein said rod is coupled to rotate the shaft at a pivot point in the housing member, and wherein the distance between the axis and the pivot position on said link is substantially equal to the distance between the pivot point on the housing member and the pivot point of said link on said rod.

* * * * *